United States Patent

[11] 3,542,075

[72] Inventor Neil W. Kroth
 Joliet, Illinois
[21] Appl. No. 731,114
[22] Filed May 22, 1968
[45] Patented Nov. 24, 1970
[73] Assignee Caterpillar Tractor Co.
 Peoria, Illinois
 a corporation of California

[54] PILOT VALVE WITH UNBALANCED SPOOL
 5 Claims, 1 Drawing Fig.
[52] U.S. Cl. ................................................. 137/625.69, 251/320
[51] Int. Cl. .................................................. F16k 11/07
[50] Field of Search ..................................... 137/625.69, 556; 251/320

[56] References Cited
UNITED STATES PATENTS
743,985  11/1903  Koelkebeck ............... 137/625.69
1,908,396  5/1933  Albright ..................... 137/625.69UX
2,718,240  9/1955  Margrave ................... 137/625.69
3,081,060  3/1963  Thomas ...................... 137/625.69X
3,203,246  8/1965  Horwitt et al. ............. 137/556X
3,229,851  1/1966  Horwitt et al. ............. 137/556X Primary Examiner—Henry T. Klinksiek
Attorney—Fryer, Tjensvold, Feix, Phillips & Lempio ABSTRACT: A compact pilot valve having a reciprocable spool. Surfaces on the spool which interact with fluid in the pilot valve are unbalanced so that fluid pressure existing within the pilot valve tends to urge the spool toward one end of the valve. A control element is preferably connected to the pilot valve spool so that the unbalanced spool is urged into interaction with the control to eliminate any free play or looseness developing in the coupling between the spool and its control.

Patented Nov. 24, 1970
3,542,075
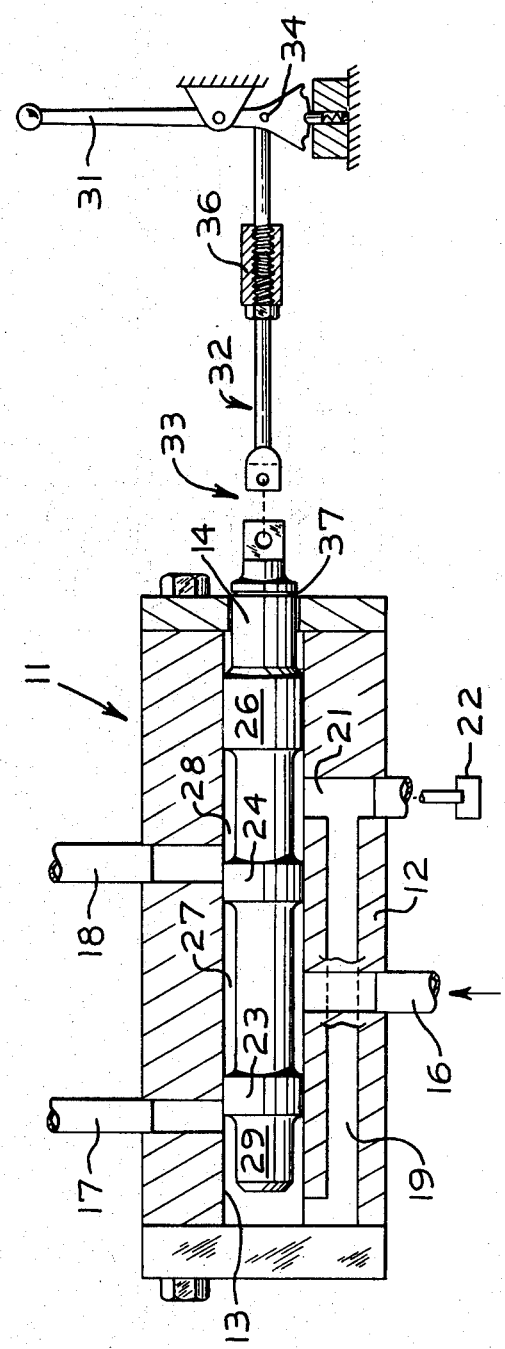
INVENTORS
NEIL W. KROTH
BY
ATTORNEYS

PILOT VALVE WITH UNBALANCED SPOOL

The present invention relates to valves and particularly to pilot valves of the type having a housing forming a bore in communication with fluid inlets and outlets. A spool is reciprocably disposed in the bore and typically has a series of spaced apart lands in generally fluid sealing relation with the bore to regulate fluid flow across the bore. Large numbers of these pilot valves are employed in various hydraulic circuits, such as those found on earthmoving machinery, with simplicity being desirable both from the standpoint of economy and compactness. Conventional pilot valves commonly employ spools having a balanced design which is most readily characterized by land masses equally interacting with fluid in the valve so that the spool tends to be repositioned only through an external control element.

The present invention provides a more compact valve having a reciprocable element arranged to regulate fluid flow through the valve and being of unbalanced design so that fluid within the valve tends to continuously urge the reciprocable element in a selected direction. Preferably the reciprocable element, which may be a spool, is of balanced design at least to the extent that it interacts with high pressure fluids while being unbalanced in those portions susceptible to interaction with low pressure fluid. In addition to permitting substantial size reduction, the reciprocable element may be unbalanced so that fluid within the valve tends to urge it into interaction with a control element to eliminate free play or mechanical looseness in a coupling between the reciprocable element and the control element. Adjustment means may be employed in the coupling to regulate the relative position of the spool within the valve housing.

Other advantages and objects of the present invention are made apparent in the following description having reference to the drawing.

The drawing is a partially sectioned view of a pilot valve constructed according to the present invention and having suitable control means coupled to its spool.

A pilot valve is indicated at 11 in the drawing with its housing 12 defining a cylindrical bore 13 for reciprocably receiving a spool 14. Pilot fluid under relatively high pressure from a source (not shown) is introduced into the valve bore 13 by means of an inlet conduit 16. A pair of fluid outlet conduits 17 and 18 are in communication with the bore 13 on each side of the inlet conduit 16. The reciprocable spool 14 permits selective regulation of fluid flow from the conduit 16 across the valve bore and into one of the conduits 17 and 18. Branch conduits 19 and 21 are in respective communication generally with the ends of the valve bore 13. Both of the branch conduits 19 and 21 are in communication with a fluid sump 22.

The pilot valve 11 is of a type normally employed for regulating operation of a double acting hydraulic motor (not shown) for example, with which the conduits 17 and 18 are in communication. With the pilot valve in the position shown in the drawing, no fluid flow is permitted across the pilot valve from the inlet 16. To operate the motor in one direction, the pilot valve spool 14 is shifted leftwardly to communicate the inlet conduit 16 with the outlet conduit 17 while communicating the other outlet conduit 18 to drain across the valve bore and through the branch conduit 21. Similarly for operation of the motor in the opposite direction, the pilot valve spool 14 is lifted rightwardly to communicate the inlet conduit 16 with the outlet conduit 18 and to permit free communication from the conduit 17 to drain through the valve bore 13 and the branch conduit 19.

Compactness of the pilot valve is accomplished through unbalanced design of the pilot valve spool 14 which permits substantial reduction of the overall length of the pilot valve. To regulate fluid flow across the valve bore 13, the spool 14 is formed with three land masses 23, 24 and 26. The land masses are formed and separated by machining or otherwise forming annular spaces 27 and 28 between each pair of adjacent land masses respectively. In keeping with the present invention, the left end of the spool (as seen in the drawing) could readily be terminated at the left side of the land mass 23. However, the portion 29 of reduced diameter at the left end of the spool serves as a stop to limit leftward positioning of the spool within the bore 13.

The unbalanced design of the spool 14 is readily apparent from a consideration of the arrangement of its lands 23, 24 and 26. The right end surface of the land 23 and the left end surface of the land 24 interact with and regulate the relatively high pressure fluid from the conduit 16 into one of the conduits 17 and 18. This portion of the spool is in balance since the reaction forces developed upon those two lands by the fluid are equal. Similarly, the right end surface of the land 24 and the left end surface of the land 26 interact with and regulate relatively low pressure fluid returning to drain from the conduit 18 and through the branch conduit 21. This portion of the spool is also balanced since the areas of the end surfaces of the land interacting with the low pressure fluid are equal and experience equal reaction forces from fluid existing therebetween. Unbalance in the spool 14 arises from the single land surface on the left side of the land mass 23 which reacts with fluid passing to drain from the conduit 17 or existing in the left end of the valve bore 13 because of residual pressure in the sump 22 during operation. Normal pressure in the sump 22 may be approximately 20 to 25 pounds per square inch, for example.

In addition to permitting size reduction of the pilot valve, the unbalanced arrangement of the spool 14 serves an additional important function in view of the control element 31 connected to the right hand of the spool 14 by means of a coupling 32. The position of the spool and operation of the pilot valve is regulated by the control element 31. Over extended periods of operation, the connections 33 and 34 between the coupling and the spool 14 and control element 31, respectively, normally tend to develop free play or mechanical looseness so that the spool position is less accurately responsive to the control element 31. With the spool 14 being unbalanced so that existing fluid pressure within the bore 13 continually urges the spool rightwardly, the connections 33 and 34 are maintained with a snug fit so that the spool position is very accurately responsive to the control element 31. The connecting member 32 is provided with adjusting means 36 for varying the length of the coupling 32. As free play develops in the various connections, the coupling may be adjusted through the means 36 to maintain the relative position of the spool within the bore while the unbalanced design of the spool insures its accurate response to the control element 31. To provide a visual indication of the amount of play developed in the coupling connections and the relative rightward shifting of the spool 14 to take up developed free play, a groove 37 is formed in the right end of the spool to be aligned with the right end of the valve housing when the spool is in its neutral position as shown in the drawing and is properly positioned relative to the outlet passages 17 and 18. As the groove 37 tends to move away from the valve housing over extended periods of operation, length of the coupling 32 is increased by adjustment of the means 36 to maintain proper relative position of the spool for regulating fluid flow across the bore.

I claim:
1. A reciprocable pilot valve, comprising:
   a valve housing defining a cylindrical bore with fluid inlet and outlet means, said bore being sealed at one end and having an opening at the other end;
   a spool reciprocably arranged in the bore to regulate fluid flow across the bore, said spool including generally annular land masses which close with the bore for regulating fluid flow within the bore, the land masses defining annular land surfaces facing in opposite direction for interaction with fluid in the bore, said spool having one end surface adjacent the sealed end of the bore and exposed to fluid pressure within the bore for unbalanced reaction of the spool to the fluid pressure so that fluid pressure within the valve continuously urges the spool in one direction; and control means operatively coupled with the spool, the unbalanced reaction of the spool to fluid pressure in the bore ore tending to maintain the spool in positive engagement with the control means.

2. The valve of claim 1 wherein an end of the spool opposite the one end surface of greater area extends from the valve housing and the control means are operatively coupled to the extended end of the spool, the coupling between the spool and the control means being susceptible to development of free play, fluid pressure tending to urge the spool toward the coupling to eliminate the free play developed in the coupling and further comprising means for indicating the amount of free play developed in the coupling and taken up by relative motion of the spool toward the coupling.

3. The valve of claim 2 further comprising means for adjusting the coupling between the control means and spool to maintain the relative position of the reciprocable spool within the bore.

4. The valve of claim 1 wherein the housing defines one inlet passage in communication with the bore for delivering relatively high pressure fluid, at least one outlet passage in communication with the bore for receiving the relatively high pressure fluid and at least one passage in communication with one end of the bore and with a normally low pressure region, the one end surface of the spool facing the one end of the bore adjacent the low pressure passage, the spool also including a pair of land end surfaces of effectively equal opposing area for receiving and regulating flow of relatively high pressure fluid from the inlet across the bore.

5. The valve of claim 4 wherein the valve housing defines two outlet passages on axially opposite sides of the inlet passage, another passage in communication with the normally low pressure region and generally with the opposite end of the bore, the low pressure region being a fluid sump, the one end surface of the spool regulating fluid flow across the bore and into the one sump passage from one of the outlet passages arranged generally adjacent thereto, the spool further defining another pair of land end surfaces of effectively equal opposing area for regulating fluid flow across the bore and into the other sump passage from the other outlet passage arranged generally adjacent thereto.